United States Patent [19]

Sumal

[11] Patent Number: 4,462,251

[45] Date of Patent: Jul. 31, 1984

[54] CONTROL DEVICE IN CONNECTION WITH AN AIR FLOW RATE METER OF AN INTERNAL COMBUSTION ENGINE

[75] Inventor: Jaihind S. Sumal, Vaihingen/Enz, Fed. Rep. of Germany

[73] Assignee: Robert Bosch GmbH, Stuttgart, Fed. Rep. of Germany

[21] Appl. No.: 411,061

[22] Filed: Aug. 24, 1982

[30] Foreign Application Priority Data

Mar. 2, 1982 [DE] Fed. Rep. of Germany ....... 3207394

[51] Int. Cl.$^3$ ............................................ G01M 15/00
[52] U.S. Cl. ......................................... 73/118; 73/204
[58] Field of Search ................ 73/118, 204; 123/478, 123/494

[56] References Cited

U.S. PATENT DOCUMENTS 4,341,114  7/1982  Plapp ..................................... 73/118

Primary Examiner—Jerry W. Myracle
Attorney, Agent, or Firm—Edwin E. Greigg

[57] ABSTRACT

A control device is proposed for the burnoff procedure of a hot wire in a constant-temperature anemometer. The control device ascertains temperature increases elapsing in an uncontrolled manner at the hot wire, for instance occurring as a result of a spontaneous ignition of gasoline fumes, and terminates a burnoff procedure, once begun, upon the occurrence of these uncontrolled temperature increases. These events are ascertained via the signal behavior of the hot wire current and are related to a computer-controlled realization and to an analog circuit layout.

8 Claims, 5 Drawing Figures

CONTROL DEVICE IN CONNECTION WITH AN AIR FLOW RATE METER OF AN INTERNAL COMBUSTION ENGINE

BACKGROUND OF THE INVENTION

The invention is based on a method and a control device for the procedure of burning off deposits from a hot wire in a constant-temperature anemometer, and further including a switching device for increasing the current through the hot wire relatively briefly in accordance with operating characteristics. An air flow rate meter operating on the principle of a constant-temperature anemometer is known from German Offenlegungsschrift No. 17 50 050, the hot wire of which is burned off after each measurement cycle in order to clean it. This is effected in the known device by means of a severe bridge imbalance and the high current flow caused thereby. Such burnoff procedures put a heavy load on the hot wire. In order to reduce this load, it has already been proposed to reduce the number of burnoff procedures, so that burnoff is performed not after each measurement cycle but only after a certain number of measurement cycles, for instance. Although these known devices do produce satisfactory results as a rule, still certain problems still arise during the course of actual operation.

The burnoff of deposits on hot wires is effected at temperatures of 1050° C., for example. The burnoff procedure lasts approximately 1 second. If the procedure is initiated after a measurement cycle has ended, that is, when the engine has stopped, then if the engine is still at operational temperature this may cause the ignition of fumes rising from the intake tube. The result is an uncontrolled temperature increase at the hot wire, which may in turn cause the destruction of the hot wire.

OBJECT AND SUMMARY OF THE INVENTION

With the control device and method according to the invention and having the characteristics revealed hereinafter it is assured that the ignition of gasoline fumes in the vicinity of the hot wire will be recognized, and appropriate countermeasures can be initiated accordingly.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
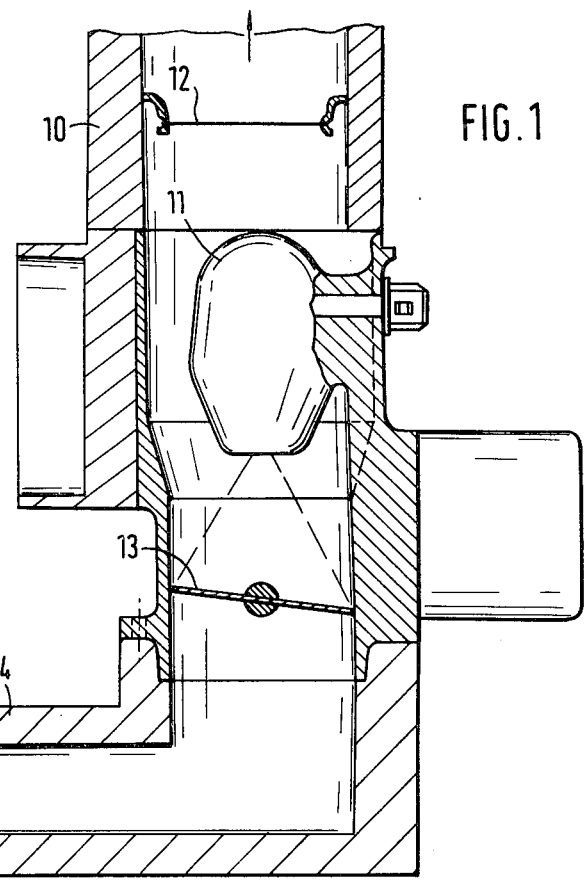
FIG. 1 shows the basic arrangement of an air flow rate sensor in the air intake tube of an internal combustion engine.

In schematic form, FIG. 1 shows the air intake tube of a mixture-compressing internal combustion engine including among other elements a hot wire, an air flow rate sensor, a central injection valve and a throttle valve. The structure in detail is as follows. A hot wire 12 of an air flow rate sensor is disposed in the air intake tube 10 upstream of an injection valve 11. The injection valve 11 injects fuel into the vicinity of the periphery of a throttle valve 13, and the resultant mixture finally proceeds via the end 14 of the intake tube oriented toward the engine to the individual cylinders, not shown.

Although this exemplary embodiment of FIG. 1 also shows the hot wire 12 disposed within the air intake tube 10 itself, other means of accommodating the hot wire are also possible; for instance, the hot wire may be disposed in a bypass conduit for the sake of further reducing the danger of soiling. FIG. 1 also clearly illustrates the problem of the possibility of spontaneous ignition of the mixture in the intake tube. That is, if the last mixture components are not aspirated away via the cylinders after the end of a measurement cycle, which is equivalent to the shutoff of the engine, then the danger exists that because of the warm intake-tube walls the gasoline fumes will rise and reach the area in which the hot wire 12 is disposed. If this hot wire is then further heated, for the purpose of burning off deposits, to a temperature of over 1000° C., these fumes may ignite and finally destroy the hot wire 12.

Figure 2:
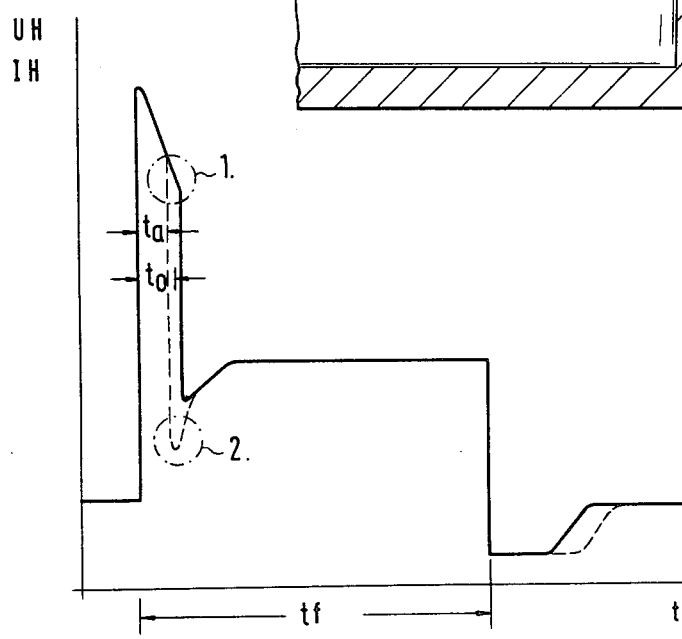
FIG. 2 shows diagrammatically the current through the hot wire during the burnoff period.

FIG. 2 illustrates the typical course of the current through the hot wire during the burnoff procedure. At the onset of the burnoff procedure, the current increases sharply up to a maximum value; it then drops, linearly at first and then abruptly, so as to become stabilized at a predetermined value until the end of the burnoff procedure. It has been found that this current course undergoes changes when spontaneous ignition of the mixture occurs; in the subject of the invention, these changes are systematically evaluated and the burnoff process is controlled accordingly.

Two changes in the current diagram of FIG. 2 are particularly pronounced. The first pertains to a shortening of the period of time of relatively high current through the hot wire (see 1.), and the second pertains to a reduction in the current below a predetermined value during the burnoff phase (see 2.).

These current courses are ascertained by means of the control device according to the invention and are used for controlling the interruption of the burnoff procedure.

Present-day experience has shown that the severe current drop during the burnoff phase caused by a spontaneous ignition of the mixture can be ascertained most simply by using measurement technology. A flow diagram to this end is shown in FIG. 3. After the onset of the burnoff procedure 20, a specific duration 21 for the burnoff procedure is established. The burnoff procedure begins at 22, and a specific burnoff current 23 is established, which is ascertained at a measuring resistor 24, for instance, in the form of a voltage. If the hot-wire current remains above a specific threshold value, then no intervention into the burnoff procedure is made and it runs its course over the preset period of time. On the other hand, if the hot-wire current drops below a specific value, which is equivalent to a specific reduction in voltage, then this is evaluated as an indication of spontaneous ignition, and the burnoff procedure is terminated via a stop input 25 of the block 21 for the duration of the burnoff procedure.

Figure 3A:
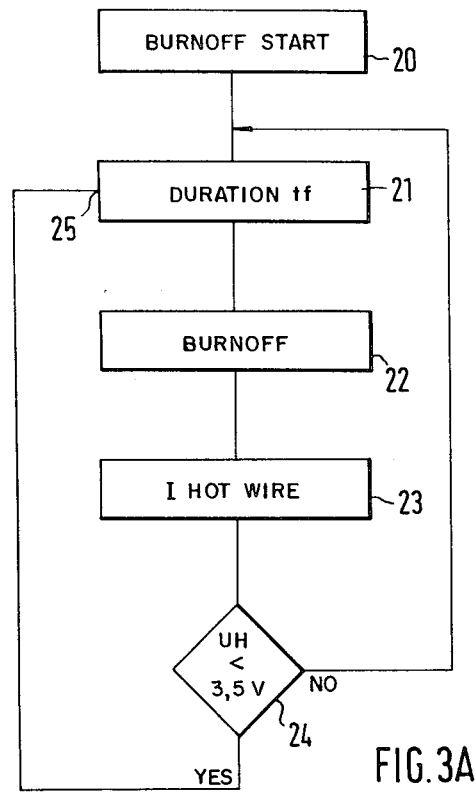
FIG. 3 provides two flow diagrams identified as 3A and 3B for recognition of a possible spontaneous ignition of the mixture.

Thus the important feature of the flow diagram of FIG. 3A is the ascertainment of the current through the hot wire and its evaluation in order to determine whether spontaneous ignition of the mixture is taking place.

Figure 3B:
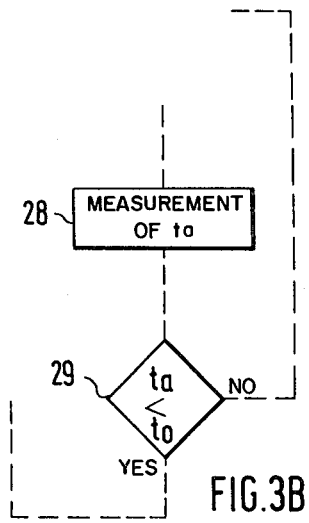

FIG. 3B shows the corresponding portion of the flow diagram when the duration $t_a$ is evaluated at 28, during which a relatively high current flows through the hot wire, at the onset of the burnoff period. In the event of spontaneous ignition, this duration $t_a$ is shorter than if there is no spontaneous ignition. It can thus be determined whether a spontaneous ignition has occurred by making an interrogation as to a median value $t_o$ at 29. In the event that it has, then the burnoff procedure is again interrupted.

With a view to a possible computer control of the burnoff procedure, FIG. 3 shows two flow diagrams. One skilled in the art will have no difficulty in programming the computer accordingly.

Figure 4:
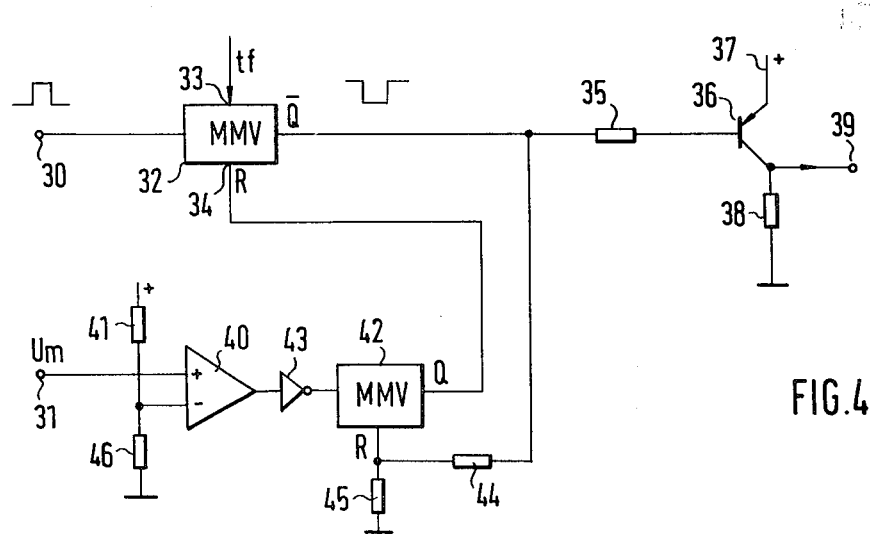
FIG. 4 shows one exemplary embodiment in analog circuitry for the control device according to the invention.

For the instance of an analog realization of the circuitry, FIG. 4 shows a basic circuit diagram of the control device according to the invention. It has two input terminals 30 and 31. A trigger pulse for starting the burnoff procedure proceeds to the control device via the first input terminal 30. At the second input 31, there is a voltage signal $U_m$ which indicates the current flow through the hot wire. The input 30 is followed by a first monostable multivibrator 32, which has one time-control input 33 and one reset input 34. The inverting output $\overline{Q}$ of the monostable multivibrator 32 is carried via a resistor 35 to the base of a PNP transistor 36, which is connected on its emitter side with a positive line 37 and the collector of which is connected via a resistor 38 to ground. An output terminal 39 is connected directly with the collector of this transistor 36.

The input terminal 31 is connected with the positive input of a comparator 40, the negative input of which is supplied with the potential of a voltage divider comprising two resistors 41 and 46 between the operating voltage lines. On the output side, the comparator 40 is connected via a reversal circuit 43 with a second monostable multivibrator 42, the Q output of which is connected with the reset input 34 of the monostable multivibrator 32. The second monostable multivibrator 42 is resettable by means of the signal at the output $\overline{Q}$ of the first multivibrator 32, which can be applied to the reset input of the monostable multivibrator 42 via a voltage divider comprising two resistors 44 and 45.

The mode of operation of the circuit layout shown in FIG. 4 is as follows:

The monostable multivibrator 32 is switched into its unstable state by means of the trigger pulse at the input 30; this corresponds to a voltage drop at the $\overline{Q}$ output which drives transistor 36, causing it to jump to positive potential at the output terminal 39. The evaluation of the current through the hot wire now begins via the voltage signal $U_m$ at the input 31. As long as this voltage value is above approximately 3.5 volts or is less than approximately 0.3 volts below the voltage during burnoff of the measuring resistor, the following monostable multivibrator 42 remains untriggered, because of the inverter 43 interposed there, and the result is that the reset input 34 of the multivibrator 32 is not subjected to a corresponding reset signal. If the voltage $U_m$ at the input terminal 31 drops below the threshold value, then the triggering of the subsequent monostable multivibrator 42 occurs, and the first monostable multivibrator 32 is reset; this in turn causes the blocking of the subsequent transistor 36. As a result, the burnoff procedure is interrupted, and the hot wire is then no longer subjected to the double stress of both the burnoff procedure and an arbitrary spontaneous combustion of the mixture at the hot wire.

This intentional interruption of the burnoff procedure in the event that fuel ignites has proved to result in a substantial improvement in the length of the life of the hot wire 12.

The signal linkage indicated in FIG. 4, via the resistor 44 to the reset input of the second monostable multivibrator 42 serves to maintain the circuit layout in predefined states whenever the burnoff procedure is not being performed.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for a control device in connection with an air flow rate sensor of an internal combustion engine for the burnoff procedure of a hot wire in a constant-temperature anemometer, having a switching device for increasing the current through the hot wire relatively briefly in accordance with operating characteristics, comprising the steps of, ascertaining a spontaneously elapsing temperature increase in the vicinity of said hot wire, and controlling the course of a burnoff signal to said hot wire in accordance with said temperature increase.

2. A method for a control device as defined by claim 1, wherein the course of the current through said hot wire is evaluated in terms of voltage in order to control the burnoff procedure.

3. A method for a control device as defined by claim 2, wherein during the burnoff procedure, a set-point/actual-value comparison of a current derived voltage signal takes place.

4. A method for a control device as defined by claim 3, wherein the comparison voltage amounts to approximately 3.5 volts and is approximately 0.3 voltage below the voltage of the burnoff procedure at a measuring resistor.

5. A method for a control device as defined by claim 1, wherein the course over time of the current through said hot wire is evaluated in order to control the burnoff procedure.

6. A method for a control device as defined by claim 5, comprising the further step of interrupting the burnoff procedure if a predetermined duration of one phase of relatively high current is not attained.

7. A control device in connection with an air flow rate sensor of an internal combustion engine for the burnoff procedure of a hot wire in a constant temperature anemometer, having a switching device for increasing the current through said hot wire relatively briefly in accordance with operating characteristics comprising, means for evaluating the current in terms of voltage through said hot wire, a first resettable timing element, means providing a trigger signal for the burnoff procedure for switching said timing element, said timing element producing an output signal for determining the burnoff procedure in terms of its duration, and comparator means for comparing a current/voltage with respect to the signal relationships of said evaluating means at said hot wire, whereby said timing element is resettable in accordance with an output signal of said comparator means.

8. A control device as defined by claim 7, further comprising a second timing element disposed between said comparator means and a reset input of said first timing element.

* * * * *